United States Patent [19]
Imura

[11] Patent Number: 6,067,323
[45] Date of Patent: May 23, 2000

[54] DECODING METHOD AND DECODING APPARATUS OF CODED MOVING IMAGE SIGNAL

[75] Inventor: Koji Imura, Yokohama, Japan

[73] Assignee: Matsushita Electric Industrial Company, Ltd., Osaka, Japan

[21] Appl. No.: 09/027,380

[22] Filed: Feb. 20, 1998

[30] Foreign Application Priority Data

Feb. 21, 1997 [JP] Japan .................................. 9-037888

[51] Int. Cl.[7] .............................. H04B 1/66; H04N 7/12
[52] U.S. Cl. ........................... 375/240; 348/419; 348/512
[58] Field of Search ................................... 348/419, 412, 348/405, 423, 418, 464, 512, 19; 375/245, 246; H04N 7/12; H04B 1/66

[56] References Cited

U.S. PATENT DOCUMENTS

| | | | |
|---|---|---|---|
| 4,706,260 | 11/1987 | Fedele et al. | 348/419 |
| 5,164,828 | 11/1992 | Tahara et al. | 348/419 |
| 5,450,132 | 9/1995 | Harris et al. | 348/418 |
| 5,534,929 | 7/1996 | Tanaka et al. | 348/405 |
| 5,659,539 | 8/1997 | Porter et al. | 348/19 |

FOREIGN PATENT DOCUMENTS 0 637 175   2/1995   European Pat. Off. .

OTHER PUBLICATIONS

Y. Takishima et al., "An Analysis of Optimum Frame Rate In Low Bit Rate Video Coding", Visual Communication, vol. 1605, Part 2, pp. 635–645, Nov. 11, 1991.
European Search Report for Int'l Appln. No. 98102079.5 dated Jun. 10, 1998.

*Primary Examiner*—Christopher Kelley
*Assistant Examiner*—Gims Philippe
*Attorney, Agent, or Firm*—Ratner & Prestia

[57] ABSTRACT

The invention provides a decoding method of coded moving image signal and a decoding apparatus using the same, being a decoding method of moving image signal obtained by coding input digital moving image signals, gathering in a unit of one picture, issuing bit streams including the time information of present picture, accumulating the bit streams in the transmission side buffer, and decoding the bit streams being controlled to code a next picture when the buffer residue capacity becomes smaller than a certain threshold, characterized by calculating the time between pictures from the generated coding amount of the received previous picture, the threshold and transmission speed, comparing the time information extracted from the input bit stream and the time between pictures, and judging whether the extracted time information is correct or not. Accordingly, if there is an error in the time information of bit streams, the error can be detected, and decoding on the basis of wrong time information is prevented, so that obvious disturbance of decoded image can be prevented.

8 Claims, 9 Drawing Sheets

DECODING METHOD AND DECODING APPARATUS OF CODED MOVING IMAGE SIGNAL

FIELD OF THE INVENTION

The present invention relates to decoding of compressed and coded digital moving image signal applied in television telephone, television conference or the like, and more particularly to detection of error in decoding method of moving image signal and decoding apparatus of moving image signal.

BACKGROUND OF THE INVENTION

The conventional coding method and decoding method of digital moving image signal includes the ITU-T Recommendation H. 261 recommended in March 1993, MPEG by ISO, and other international standards, and the ITU-T Recommendation H. 261 is mainly described in this specification. The H. 261 is a standard of coding method consisting of the following three technical elements.

First is the motion compensation predicting system, in which one picture (image) of input image signal (hereinafter called input picture), and an already coded picture (image) (hereinafter called coded picture) are compared, the motion amount between the two pictures is measured (motion detection), and the input picture is predicted from the motion amount and coded picture. The difference between the predicted image and input picture (prediction error signal) is calculated, and the prediction error signal and motion amount are transmitted to the receiving side, so that image compression coding is realized by transmitting image information in a small data quantity.

Second is the discrete cosine transform (DCT) system, in which the prediction error signal is transformed into a frequency region. This prediction error signal, when transformed into a frequency region, is characterized by concentrating power in a specific frequency region (low frequency region). By making use of this feature, it is combined with the third system explained below, and the image information can be transmitted in a further small data quantity.

Third is the variable length coding (VLC) system, in which, by making use of the nature of concentration of power in a specific frequency region, the coefficient of frequency at high rate of appearance is expressed by a short coding length, while the coefficient of frequency at low rate of appearance is expressed by a long coding length, so that the average coding length is shortened, and by employing this system, the image information can be transmitted in a small data quantity.

These three technical elements are not applied at once in the entire picture, but are applied in individual macro blocks formed by dividing the picture into blocks (macro blocks) of 16 16 pixels each.

An outline composition of output bit stream (bit row) coded by this ITU-T Recommendation H. 261 is described below by referring to an explanatory diagram in FIG. 4.

At the beginning of a bit stream expressing a picture, a specific bit stream showing start of a picture called picture start code is disposed. Next is disposed picture control information (frame control information) showing how to decode this picture. If this information is destroyed by transmission error, a different picture from the transmitted one is reproduced at the receiving side, and hence these pieces of information are very important. Consequently, control information is disposed in a group of blocks gathering plural macro blocks in one unit, and further information is disposed in each macro block. One macro block contains control information such as motion amount and DCT coefficient information. This macro block information is disposed by the number of macro blocks contained in the input picture.

The picture control information contains the time information of the picture called Temporal Reference (hereinafter called TR). In the TR, lower five bits of the picture number of input picture are used. Since the H. 261 is the image coding method for use in real time communication at low transmission speed, delay until the image data from the coding side reaches the decoding side must be minimum. For this purpose, a technique called decimation is applied to decrease the number of pictures to be coded. Hence, values of TR are not always continuous, but are intermittent.

The decimating technique is further described below. First, assume the following.

(1) Coding process of input picture and decoding process of received data are completed instantly (because the time is regarded very short as compared with the transmission time).

(2) The processing system of input picture is of NTSC, and hence a picture is present in every $1/30$ second. Picture numbers are increased sequentially from the first picture in every one of picture in $1/30$ second each.

(3) The coded output bit stream is immediately stored in the transmission buffer, and is extracted from the transmission buffer at a bit rate conforming to the transmission speed.

(4) In decimating, when the buffer residue in the transmission buffer becomes smaller than a certain threshold, a next picture is incorporated and coded.

For the ease of understanding them, a case without decimating (FIG. 5) and a case with decimating (FIG. 6) are comparatively described below.

In FIG. 5, the axis of abscissas denotes the time and picture number, and the axis of ordinates represents the residue of output bit stream in the transmission buffer. First, at time zero (picture number 0), the coded bit stream is accumulated in the transmission buffer ([1] in diagram). Then, depending on the transmission speed, the bits are transmitted from the transmission buffer. Accordingly, the residue of the transmission buffer decreases as indicated by broken line. The time when all data of picture number 0 reaches the decoding side is the position of [2] in the diagram at the intersection of the broken line and axis of abscissas. Hence, the delay time is t0.

Consequently, $1/30$ second later, a picture of picture number 1 is entered, and its output bits are superposed on the transmission buffer, and, same as above, the time when picture 1 reaches the decoding side is the intersecting position of the broken line and axis of abscissas, linking [3] and [4] in the diagram. Hence, the delay time is t1. As clear from the diagram, at time $1/30$ second, bits of picture 0 are remaining, and by coding picture 1, until all bit streams of picture 0 are transmitted completely, bit streams of picture 1 stay in the transmission buffer, and the delay time is extended. Similarly, as pictures 2, 3, . . . , n are continued, the delay time tn continues to increase until real time communication is disabled.

Next is explained the processing by decimating. In FIG. 6, the axis of ordinates and axis of abscissas are same as defined in FIG. 5. Similarly, all bit streams of picture 0 are completely transmitted at time [2] in the diagram. The delay time can be shortened by incorporating the next coded picture when the residue of the transmission buffer is minimum, and therefore picture 2 is coded at time (²⁄₃₀ second) when the buffer residue is smaller than the threshold. Bit streams when coding picture 2 are completely transmitted at time [3], and the delay time is t2. Therefore, the delay time is shorter than the above case without decimating.

Thus, by employing the decimating technique, the delay time can be shortened. It is also understood easily that the values of TR are not continuous but intermittent.

The importance of TR is described below.

In the H. 261, in real time communication at low transmission speed, since the coded picture is discontinuous as a result of decimating, the TR is required at the decoding side in order to display the reproduced image in correct time.

Incidentally, the ITU-T Recommendation H. 263 recommended in 1995 is a further efficient coding method on the basis of the ITU-T Recommendation H. 261. In this method, a method called PB frame is employed. In this method, as shown in FIG. 7, from coded picture N−2 by coding N−2-th picture, picture N of the N-th picture to be coded is predicted and coded, and from coded picture N−2 and reproduced coded picture N, coded picture N−1 is predicted. The moving amount (MV) between coded pictures N−2 and N is proportionally distributed by the time (t) from coded picture N−2 to N, and the time (tb) from coded picture N−1 to N, and hence coded picture N−1 is predicted. In this case, the time information is necessary, and hence the TR is needed. Thus, the TR is very important picture control information.

However, if this very important time information of TR is broken by transmission error, wrong time may be displayed at the decoding side, or in the PB frame method, intermediate picture cannot be decoded correctly.

SUMMARY OF THE INVENTION

It is hence an object of the invention to present a decoding method of moving image signal and a decoding apparatus of moving image signal capable of correcting error securely, by judging whether correct or not the time information extracted from picture control information (frame control information) of bit streams expressing a picture.

To achieve the object, the decoding method of the invention is a decoding method of moving image signal for coding input digital moving image signals, gathering in a unit of one picture, issuing bit streams including the time information of present picture, accumulating the bit streams in the transmission side buffer, and decoding the bit streams being controlled to code a next picture when the buffer residue capacity becomes smaller than a certain threshold, comprising a step of calculating the time between pictures from the generated coding amount of the received previous picture, the threshold and transmission speed, a step of comparing the time information extracted from the input bit stream and the time between pictures, and a step of judging whether the extracted time information is correct or not. Accordingly, if there is an error in the time information of bit streams, the error can be detected, and decoding on the basis of wrong time information is prevented, so that obvious disturbance of the decoded image can be avoided.

The decoding apparatus of the invention is a decoding apparatus comprising information source decoding means for coding input digital moving image signals, gathering in a unit of one picture, issuing bit streams including the time information of present picture, accumulating the bit streams in the transmission side buffer, and decoding by receiving the bit streams being controlled to code a next picture when the buffer residue capacity becomes smaller than a certain threshold, time information extracting means for extracting the present time information from bit streams, counter means for counting the generated coding amount of the received previous picture, picture time calculating means for calculating the time between pictures that can be obtained from the generated coding amount of the previous picture, the threshold and transmission speed, and judging means for judging whether correct or not the extracted time information, by comparing the time between pictures calculated by the picture time calculating means and the time information extracted from the input bit streams.

Figure 1:
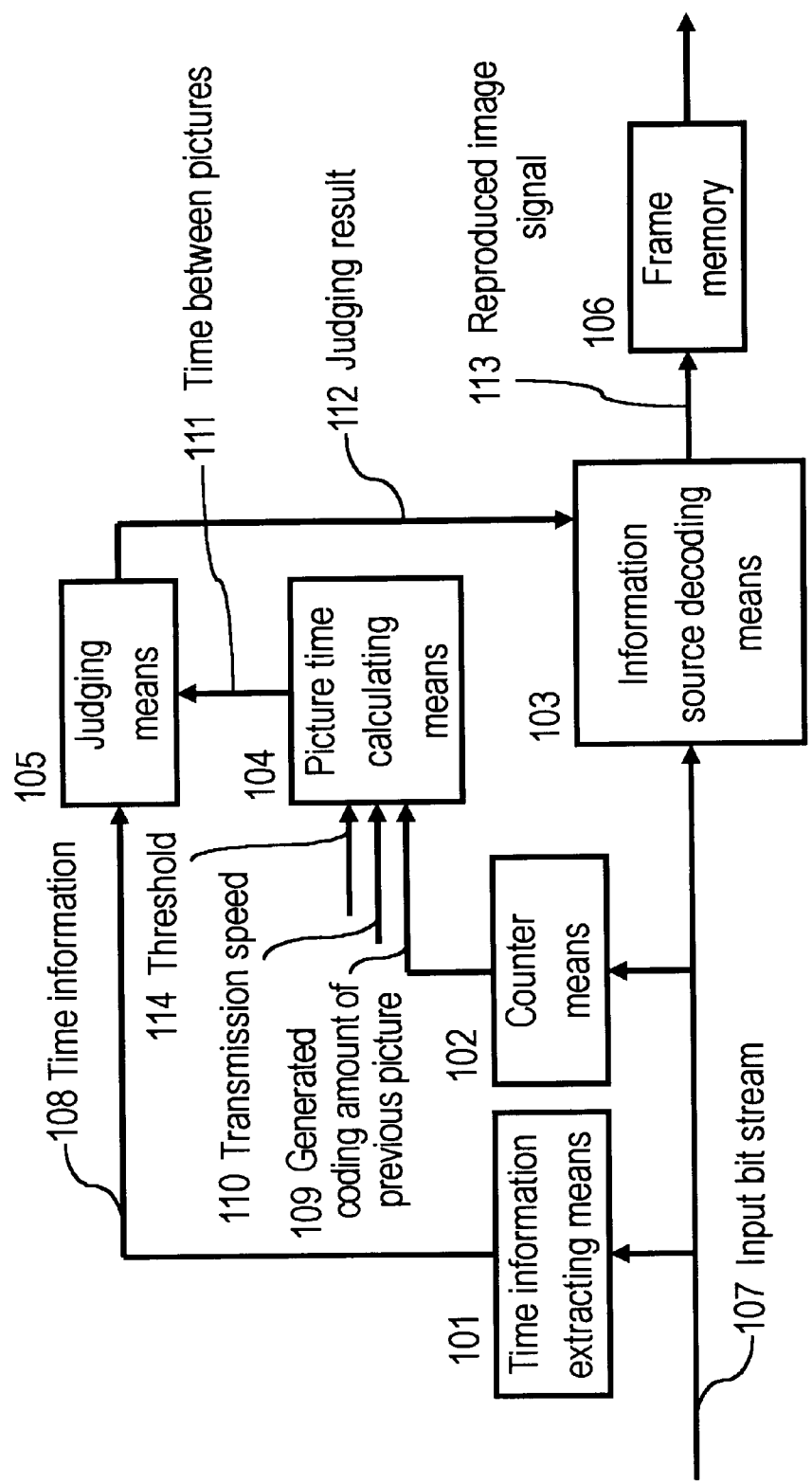
FIG. 1 is a block diagram showing a constitution of a first embodiment of a decoding apparatus by applying a first embodiment of a decoding method of moving image signal according to the invention.

| Reference Numerals | |
|---|---|
| 101 | Time information extracting means |
| 102 | Counter means |
| 103 | Information source decoding means |
| 104 | Picture time calculating means |
| 105 | Judging means |
| 106 | Frame memory |
| 107 | Input bit stream |
| 108 | Time information |
| 109 | Generated coding amount of previous picture |
| 110 | Transmission speed |
| 111 | Time between pictures |
| 112 | Judging result |
| 113 | Reproduced image signal |
| 114 | Threshold |
| 201 | Stuffing bit counter means |
| 202 | Adder |
| 203 | Number of stuffing bits |
| 301 | Receiving means |
| 302 | Transmission frame length counter means |
| 303 | Transmission frame missing detecting means |
| 304 | Adder |
| 305 | Detecting result |
| 306 | Transmission frame length |

DESCRIPTION OF THE PREFERRED EMBODIMENTS (Embodiments)

Referring now to the drawings, preferred embodiments of decoding method and decoding apparatus of moving image signal according to the invention are described in detail below.

(First Embodiment)

FIG. 1 is a block diagram showing a constitution of a first embodiment of a decoding apparatus by applying a first embodiment of a decoding method of moving image signal according to the invention, in which reference numeral 101 is time information extracting means, 102 is counter means, 103 is information source decoding means, 104 is picture time calculating means, 105 is judging means, 106 is frame memory, 107 is an input bit stream (bit row), 108 is time information, 109 is a generated coding amount of received previous picture, 110 is transmission speed, 111 is time between pictures, 112 is judging result, 113 is a reproduced image signal, and 114 is a threshold.

Before explaining the detailed operation at the decoding side, the basic operation of the picture time calculating means 104 is described.

The coded image signal to be decoded in the invention is a moving image signal obtained by sequentially coding digital moving image signals, gathering in a unit of one picture, issuing bit streams including the time information of present picture, accumulating the bit streams in the transmission buffer at the transmitting side, and being controlled to code a next picture when the residue of capacity in this transmission buffer becomes smaller than a preset threshold.

Accordingly, at the transmitting side, when the transmission buffer becomes lower than a certain threshold, a coded picture is incorporated and coded. Hence, the minimum number of bits of the buffer residue of the transmission buffer when the previous picture is incorporated is 0, and the maximum number of bits is this threshold.

Figure 8:
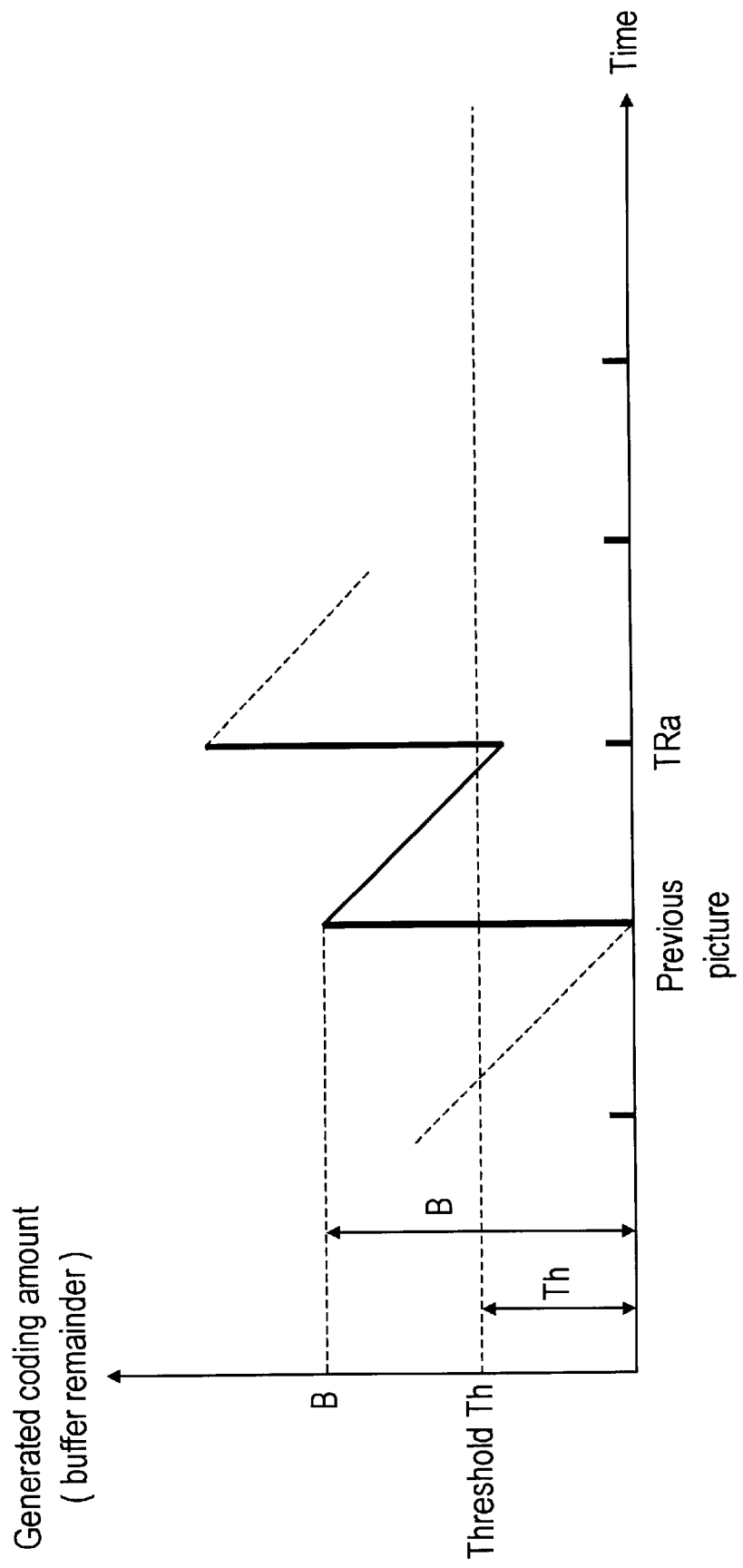
FIG. 8 is an explanatory diagram showing next coded picture incorporating time when incorporating coded picture at minimum residue of buffer.

In FIG. 8, the previous picture is incorporated when the buffer residue is minimum, showing the incorporating time of the present picture. In the diagram, Th is the threshold, B is the generated coding amount of previous picture, and S is the transmission speed.

Supposing the previous picture is incorporated when the buffer residue is minimum (0), the present picture to be incorporated in the first picture since the buffer residue becomes smaller than the threshold, and assuming this picture number to be TRa, we obtain $$TRa = Int[(B-Th) \div S \div 1/30] + 1 \qquad [1]$$

where Int operation is the process of discarding below the decimal point.

Figure 9:
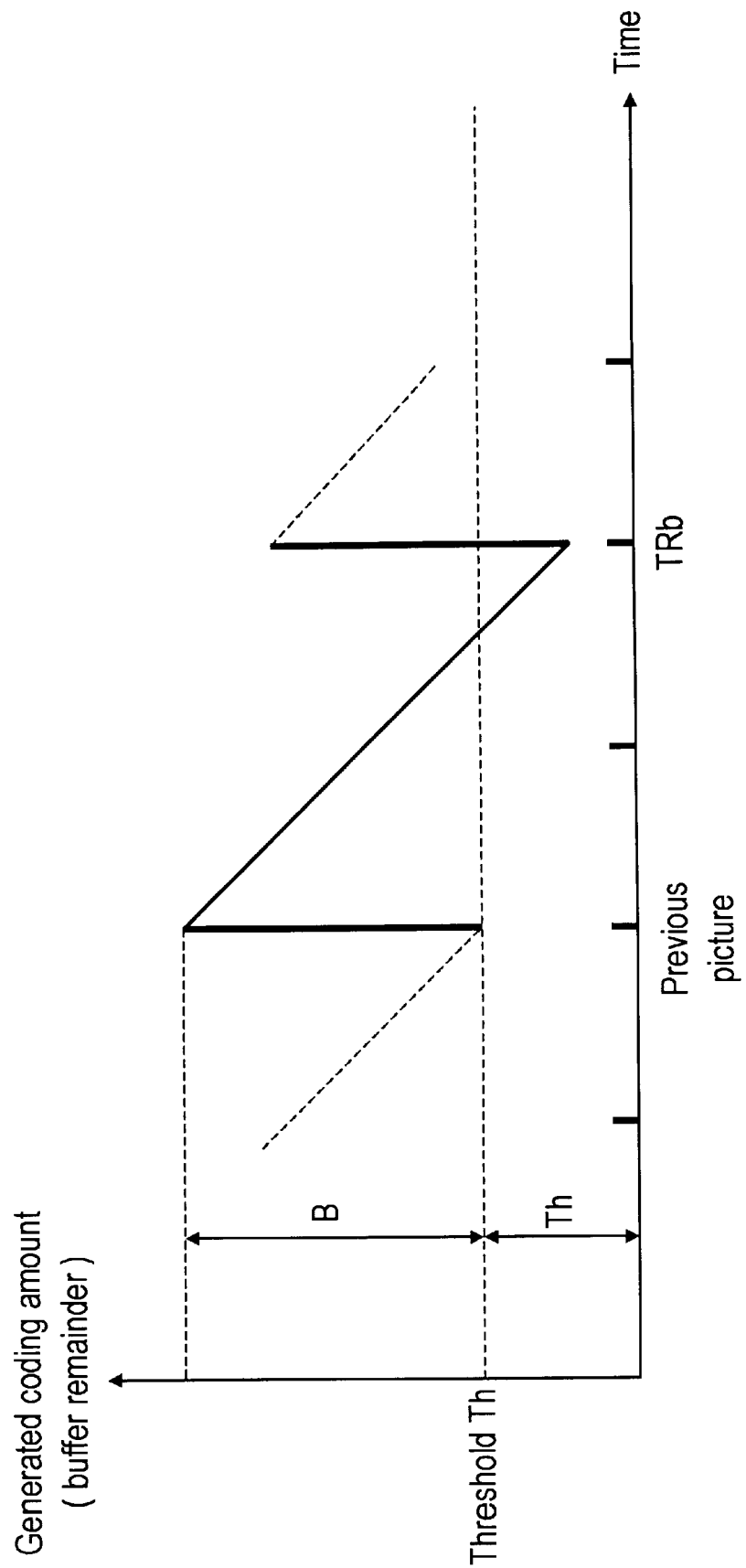
FIG. 9 is an explanatory diagram showing next coded picture incorporating time when incorporating coded picture at maximum residue of buffer.

Similarly, in FIG. 9, the previous picture is incorporated when the buffer residue is maximum, showing the incorporating time of the present picture.

Supposing the previous picture is incorporated when the buffer residue is maximum (Th), the present picture to be incorporated in the first picture since the buffer residue becomes smaller than the threshold (Th), and assuming this picture number to be TRb, we obtain $$TRb = Int[B \div S \div 1/30] + 1 \qquad [2]$$

Thus, from the generated coding amount of previous picture, threshold and transmission speed, the picture number of the present picture being transmitted is known to be TRa or more to TRb or less. Therefore, if the time information extracted from the input bit stream is out of the range of TRa and TRb, it can be judged to be an error.

The detailed operation at the decoding side is described below. In the time information extracting means 101, only time information is extracted from the input bit stream 107, and time information 108 is issued. Supposing the value of this time information 108 to be, for example, 13 (01101 in binary notation) and that the difference from the previous picture to be 4 pictures (assuming the previous picture to be 9), in the counter means 102, the number of bits of the previous picture received from the input bit stream 107 is counted, and the generated coding amount 109 is issued (in this example, this amount is supposed to be 7200 bits). In the information source decoding means 103, the input bit stream 107 is decoded according to the recommendation of the ITU-T Recommendation H. 261, and a reproduced image 113 is issued and stored in the frame memory 106.

In the picture time calculating means 104, from the generated coding amount (7200 bits) 109, threshold (supposing to be 1000 bits in this example) 114, and transmission speed (64 kbps in this example) 110, the time between pictures 111 is calculated in the above method and issued.

In this case, from formula 1 and formula 2, we obtain $$TRa = Int[(B-Th) \div S \div 1/30] + 1 = Int[(7200-1000) \div 64000 \div 1/30] + 1 = 3$$

$$TRb = Int[B \div S \div 1/30] + 1 = Int[7200 \div 64000 \div 1/30] + 1 = 4 \qquad [3]$$

In the judging means 105, the time between pictures (TRa and TRb) 111 and time information (the difference being 4 pictures) 108 are compared. In this case, the value of the time information 108 is in a range of TRa and TRb, and hence it is known that there is no error. The judging result 112 is fed into the information source decoding means 103, and the specified decoding process is done.

Herein, suppose an error of 1 bit has occurred in the time information 108. If the highest bit of the time information 108 is an error, the value of the time information 108 is 29 (11101 in binary notation), and the difference from the previous picture is 20. This value is out of the range of TRa and TRb, and hence it is judged to be an error.

In this way, the time information of the present coded picture can be obtained by the time information extracting means, and also the generated coding amount of the received previous picture can be obtained by the counter means. Moreover, by feeding the time information, generated coding amount of received previous picture, and threshold, the available time between pictures can be calculated by the picture time calculating means. By feeding the time information and available time between pictures, it is possible to judge whether the time information of the present picture is correct or not by the judging means, and if the value of the time information is out of the range of the available time between pictures, it is judged to be an error, so that decoding of high picture quality without error can be realized by the subsequent post-processing depending on the circumstance.

In the embodiment, the picture number is used as the time information, but other time information may be similarly applied as far as the time between pictures can be known from the information.

(Second Embodiment)

Figure 2:
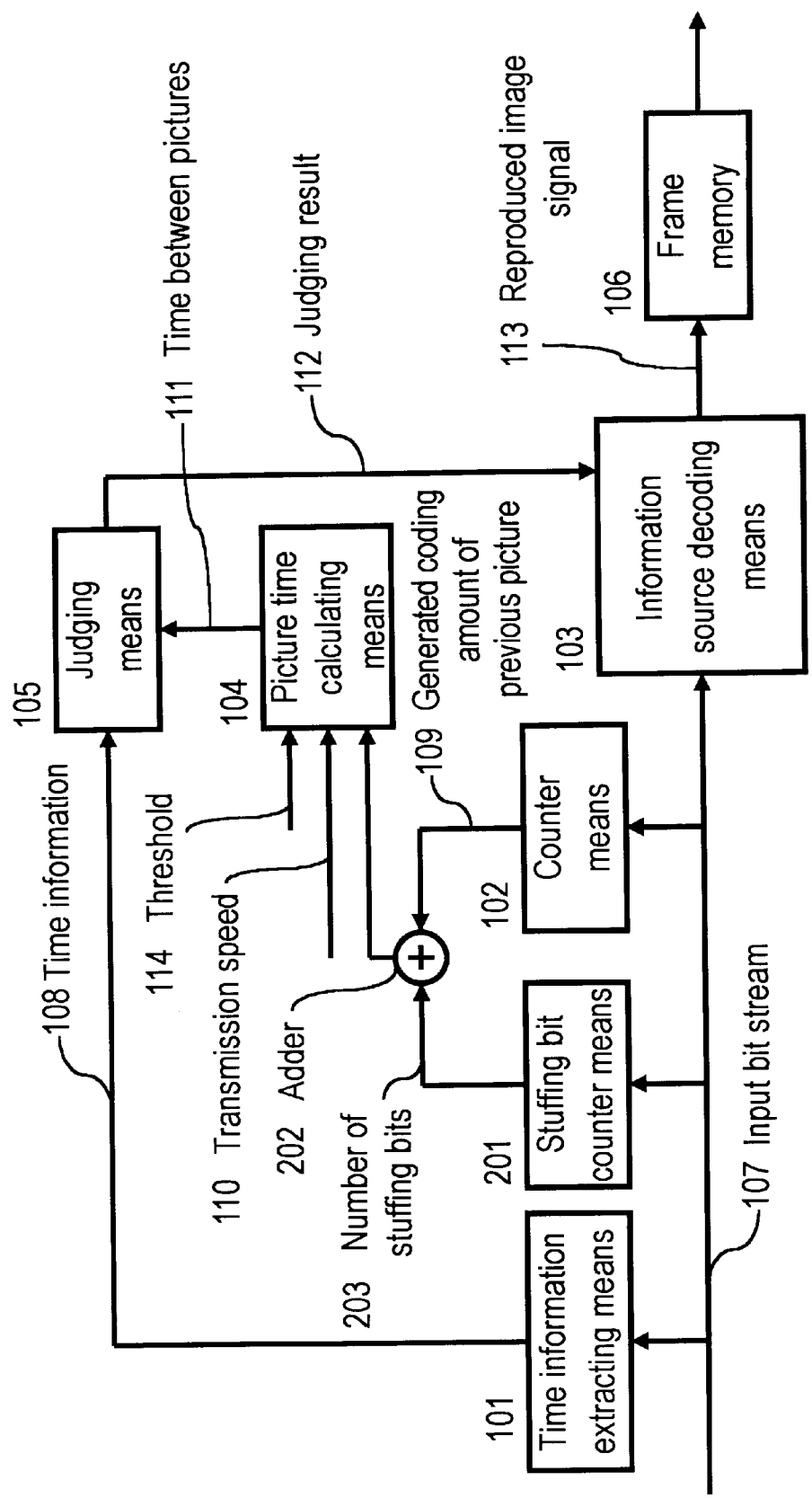
FIG. 2 is a block diagram showing a constitution of a second embodiment of a decoding apparatus by applying a second embodiment of a decoding method of moving image signal according to the invention.

FIG. 2 is a block diagram showing a constitution of a second embodiment of a decoding apparatus by applying a second embodiment of a decoding method of moving image signal according to the invention, and in FIG. 2, same constituent members as the constituent members described in FIG. 1 are identified with same reference numerals, and detailed description is omitted. In FIG. 2, reference numeral 201 is stuffing bit counter means, 202 is an adder, and 203 is the number of stuffing bits.

This embodiment relates to a case of transmission of stuffing bits to compensate for bits when the transmission buffer of the transmitting side generates an underflow.

This is a method of containing the number of bits of the stuffing bits being transmitted in the generated coding amount of the received previous picture, and if the transmission buffer of the transmitting side generates an underflow during transmission of bit streams of the previous picture, a correct time between pictures can be calculated by containing the number of bits of the stuffing bits in the generated coding amount of the received previous picture.

In the stuffing bit counter means 201, the number of stuffing bits is counted from the input bit stream 107, and the number of stuffing bits 203 is issued. In the adder 201, the number of stuffing bits 203 and the generated coding amount 109 of the received previous frame are added and issued, so that the time between picture in consideration of the stuffing bits can be calculated.

(Third Embodiment)

Figure 3:
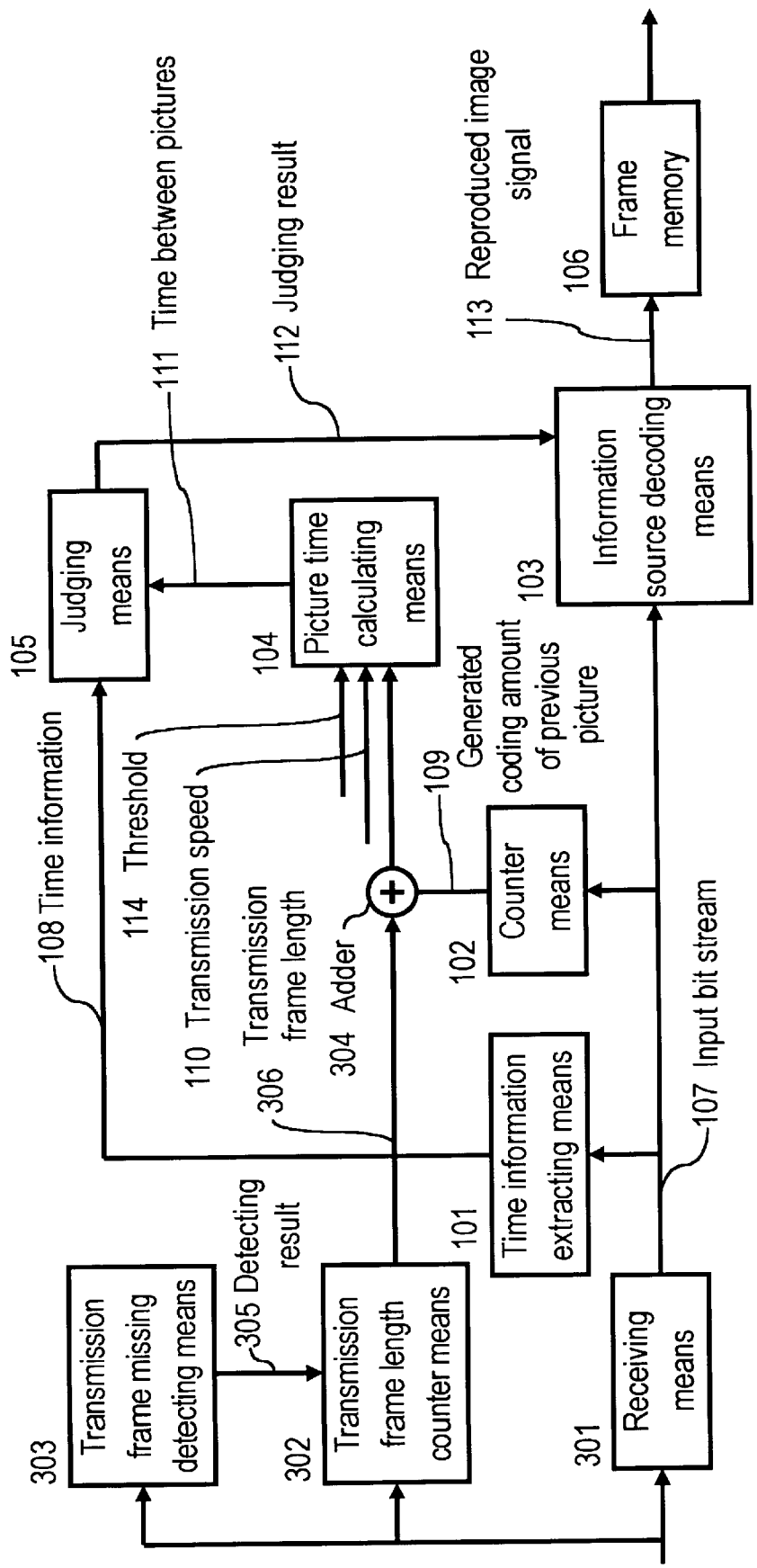
FIG. 3 is a block diagram showing a constitution of a third embodiment of a decoding apparatus by applying a third embodiment of a decoding method of moving image signal according to the invention.
Figure 4:
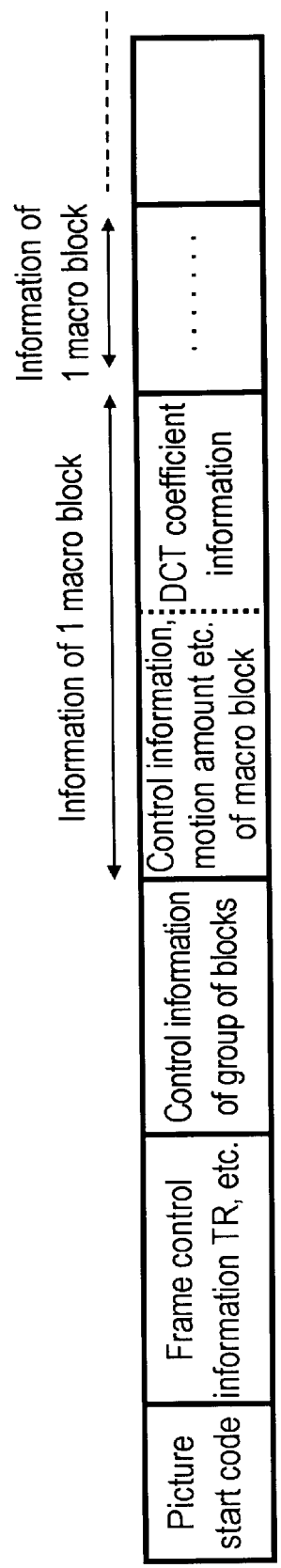
FIG. 4 is an explanatory diagram (data stream of Recommendation H. 261) of a constitution of a conventional bit stream.
Figure 5:
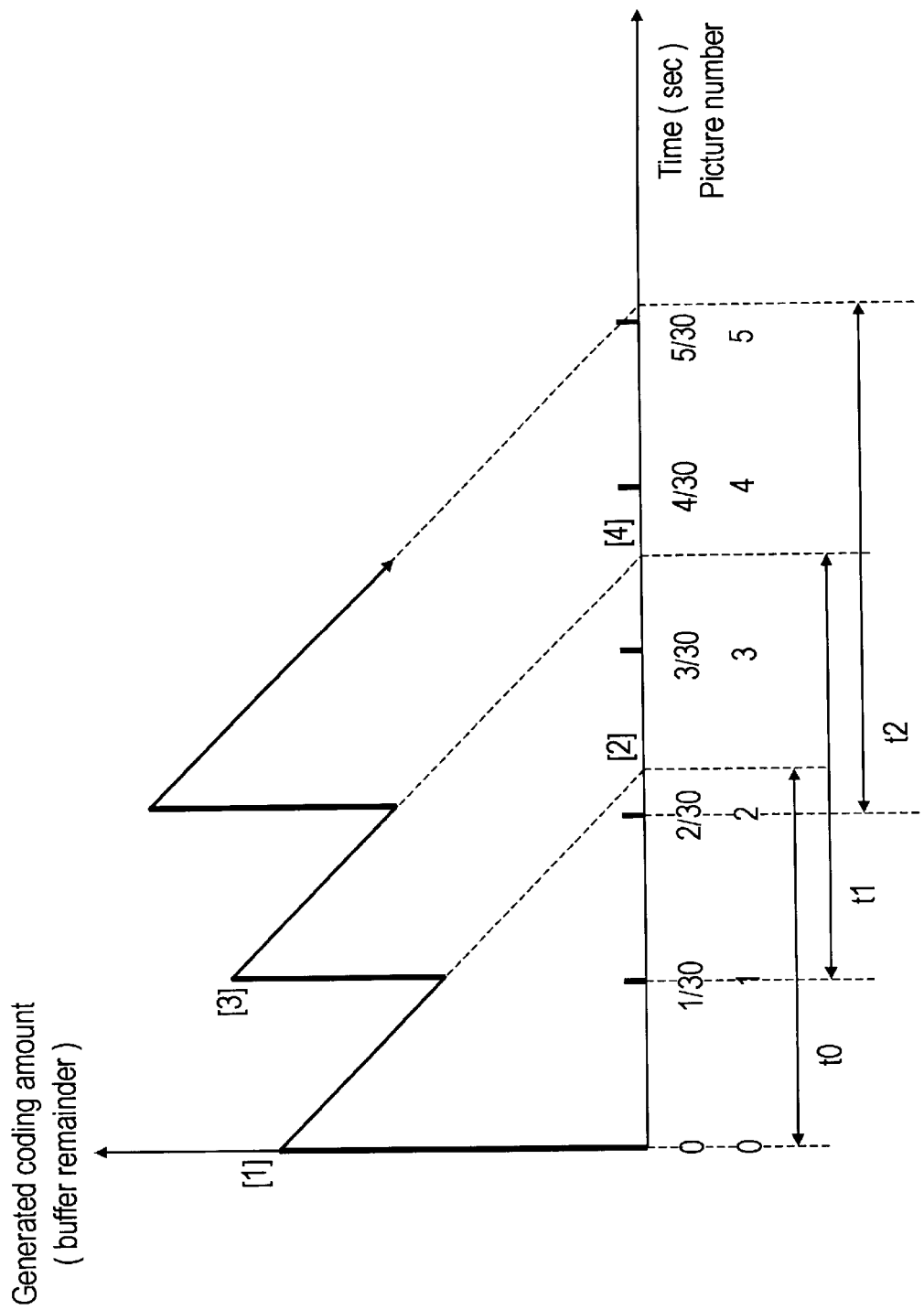
FIG. 5 is an explanatory diagram showing transmission delay without decimating technique.
Figure 6:
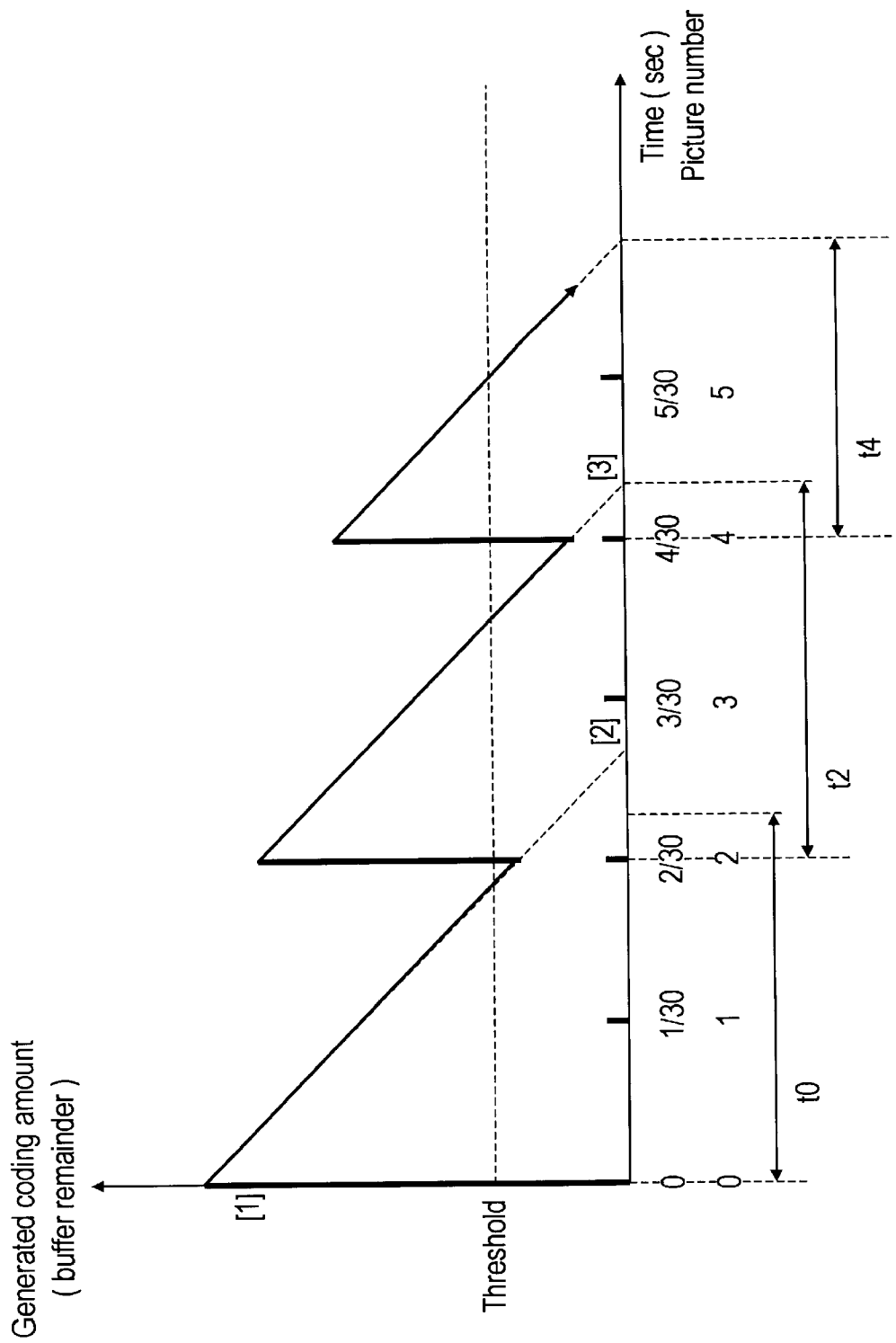
FIG. 6 is an explanatory diagram showing transmission delay with decimating technique.
Figure 7:
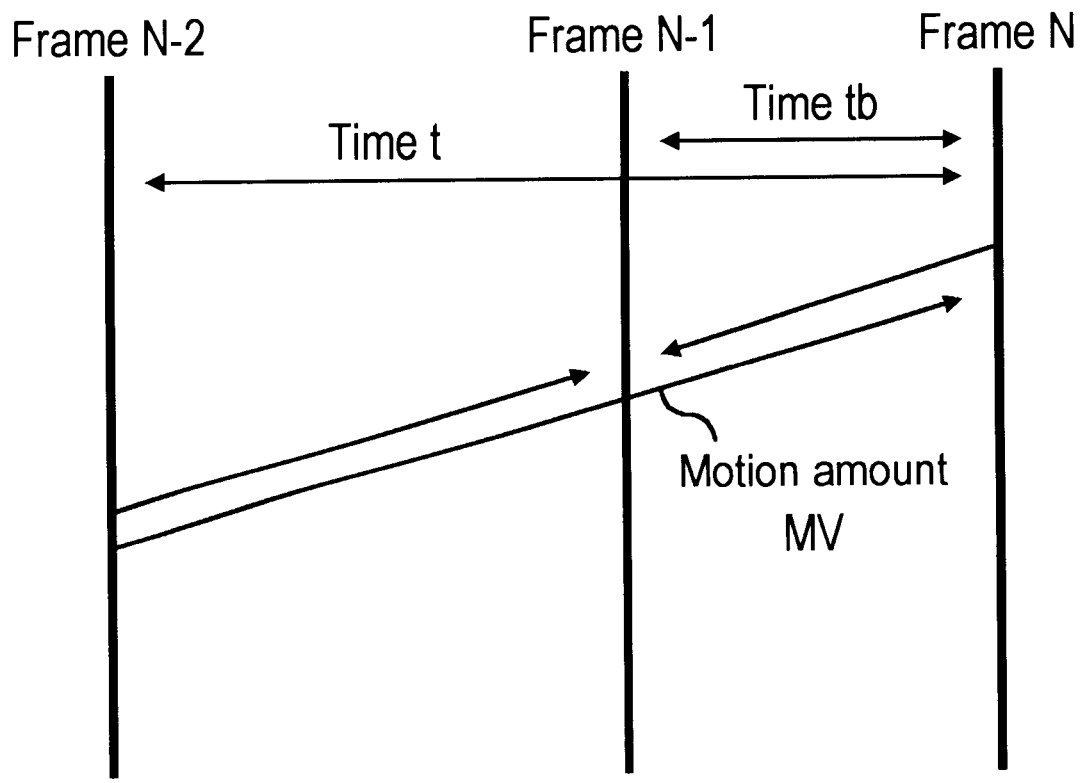
FIG. 7 is an explanatory diagram showing PB frame method in Recommendation H. 263.

FIG. 3 is a block diagram showing a constitution of a third embodiment of a decoding apparatus by applying a third embodiment of a decoding method of moving image signal according to the invention, and in FIG. 3, same constituent members as the constituent members described in FIG. 1 are identified with same reference numerals, and detailed description is omitted. In FIG. 3, reference numeral 301 is receiving means, 302 is transmission frame length counter means, 303 is transmission frame missing detecting means, 304 is an adder, 305 is the detecting result, and 306 is the transmission frame length.

In the method of the embodiment, bit streams divided into plural transmission frames are received, when any one of the transmission frames is missing, the number of bits included in that transmission frame or the number of bits of image information included in that transmission frame is contained in the generated coding amount of the received previous picture, and therefore if the transmission frame is missing during transmission of previous picture, by containing the number of bits included in that transmission frame or the number of bits of image information included in that transmission frame in the generated coding amount of the received previous picture, the correct time between pictures can be calculated.

First, in the receiving means 301, the signal divided into plural transmission frames is received as input bit stream 107 of the image. In the transmission frame missing detecting means 303, if a transmission frame cannot be detected due to transmission error and the transmission frame is missing, the detecting result 305 of detection of missing is issued. When the missing is detected, the missing transmission frame length 306 is issued by the transmission frame length counter means 302.

If only image information is contained in the transmission frame, the number of bits of transmission frame is issued. Or, if other media (sound, etc.) is multiplexed in the same transmission frame, only the number of bits of image information therein is issued. Further, if the number of bits of image information included in the transmission frame is not known due to missing, the transmission frame length is issued.

In the adder 304, the transmission frame length 306 and the generated coding amount of received previous picture 109 are added and issued, so that the time between pictures in consideration of missing of transmission frame can be calculated.

As explained herein, according to the decoding method of coded moving image signal and decoding apparatus of moving image signal of the invention, error in time information can be detected without adding redundant bits such as error detection code or without lowering the coding efficiency. If an error detection code is added, meanwhile, and when an error exceeding the capacity occurs and the error is overlooked, the error detecting capacity can be reinforced by employing the invention.

Moreover, if deviation occurs in the generated coding amount of the received previous picture by insertion of stuffing bits in the event of an underflow, deviation can be prevented by calculating together with the number of such bits.

Or, if deviation occurs in the generated coding amount of received previous picture due to missing of transmission frame during transmission, such deviation can be prevented by calculating together with the number of bits included in the transmission frame or the number of bits of image information in the transmission frame.

What is claimed is:

1. A decoding method for moving image signals obtained by sequentially coding received digital moving image signals, provided in units of one picture, issuing bit streams including time information of a present picture, accumulating the bit streams in a transmission buffer at a transmitting side, and controlling the bit stream to code a next picture when the residue of capacity in the transmission buffer becomes smaller than a preset threshold, the decoding method comprising the steps of:

calculating the time between a previous picture and the present picture from the generated coding amount of the received previous picture, the threshold and transmission speed, comparing the time information of the present picture extracted from the bit stream and the calculated time between pictures, and judging whether the time information of the present picture on the basis of the time information of the present picture and the time between pictures is correct or in error.

2. A decoding method of moving image signals of claim 1, wherein the number of bits of the stuffing bits transmitted when the transmission buffer of the transmitting side generates an underflow is included in the generated coding amount of the received previous picture.

3. A decoding method of moving image signal of claim 1, wherein bit streams divided into plural transmission frames are received, and when any one of the transmission frames is missing, the number of bits contained in that transmission frame or the number of bits of the image information contained in that transmission frame is included in the generated coding amount of the received previous picture.

4. A decoding apparatus for moving image signals obtained by sequentially coding received digital moving image signals, provided in units of one picture, issuing bit streams including time information of a present picture, accumulating the bit streams in a transmission buffer at a transmitting side, and controlling the bit stream to code a next picture when the residue of capacity in the transmission buffer becomes smaller than a preset threshold, the decoding apparatus comprising:

information source decoding means, time information extracting means for extracting time information of the present picture from the bit streams, counter means for counting the generated coding amount of a received previous picture, picture time calculating means for calculating the time between the previous picture and the present picture by the generated coding amount of the previous picture, the threshold and transmission speed, and judging means for judging whether the time information of the present picture on the basis of the time information of the present picture and the time between pictures is correct or in error.

5. A decoding apparatus of moving image signal of claim 4, further comprising:

stuffing bit counting means for counting the number of bits of stuffing bits transmitted when the transmission buffer at the transmitting side generates an under flow, and adder for adding the generated coding amount of the receiving previous picture and the number of stuffing bits.

6. A decoding apparatus of moving image signal of claim 4, further comprising:

receiving means for receiving bit streams divided into plural transmission frames, transmission frame missing detecting means for detecting missing transmission frame, transmission frame length counter means for counting the number of bits contained in that transmission frame or the number of bits of image information contained in that transmission frame, and an adder for adding the generated coding amount of the received previous picture and the number of bits.

7. A decoding method for moving image signals obtained by sequentially coding received digital moving image signals, provided in units of one picture, issuing bit streams including time information of a present picture, accumulating the bit streams in a transmission buffer at a transmitting side, and controlling the bit stream to code a next picture when the residue of capacity in the transmission buffer becomes smaller than a preset threshold, comprising:

calculating first time information of the picture coded, when the residue of the transmission buffer is zero, from the generated coding amount of a previous picture, the threshold and transmission speed, calculating second time information of the picture coded, when the residue of the transmission buffer is equal to the threshold, from the generated coding amount of the previous picture, the threshold and transmission speed, calculating the time between pictures from the first time information and second time information calculated by a first calculating means and a second calculating means, and judging whether the time information of the present picture is correct or in error, by comparing the time information of the present picture extracted from the bit stream and the time between pictures.

8. A decoding apparatus for moving image signals obtained by sequentially coding received digital moving image signals, provided in units of one picture, issuing bit streams including time information of a present picture, accumulating the bit streams in a transmission buffer at a transmitting side, and controlling the bit stream to code a next picture when the residue of capacity in the transmission buffer becomes smaller than a preset threshold, the decoding apparatus comprising:

information source decoding means, time information extracting means for extracting time information of the present picture from the bit streams, counter means for counting the generated coding amount of a received previous picture, first calculating means for calculating first time information of the picture coded, when the residue of the transmission buffer is zero, from the generated coding amount of the previous picture, the threshold and transmission speed, second calculating means for calculating second time information of the picture coded, when the residue of the transmission buffer is equal to the threshold, from the generated coding amount of the previous picture, the threshold and transmission speed, picture time calculating means for calculating the time between pictures by the first time information and second time information, and judging means for judging whether the time information of the present picture is correct or in error on the basis of the time information of the present picture and the time between pictures.

* * * * *